Dec. 3, 1968  H. L. LAQUER ET AL  3,414,777
AUTOMATIC SUPERCONDUCTING PUMP
Filed June 1, 1966  2 Sheets-Sheet 2

INVENTOR.
Henry L. Laquer, Keith J. Carroll,
Edward F. Hammel
BY ns Patent Office 3,414,777
Patented Dec. 3, 1968

3,414,777
AUTOMATIC SUPERCONDUCTING PUMP
Henry L. Laquer, Espanola, and Keith J. Carroll and
Edward F. Hammel, Los Alamos, N. Mex., assignors
to The United States of America as represented by the
United States Atomic Energy Commission
Filed June 1, 1966, Ser. No. 555,930
2 Claims. (Cl. 317—123)

ABSTRACT OF THE DISCLOSURE

The switches previously used in flux pumps, i.e., an incremental method for energizing superconducting magnet coils by repetitive electrical energy injection, are eliminated by introducing a secondary superconducting coil (of low inductance) in parallel with the larger superconducting main coil (higher inductance).

---

The invention described herein was made in the course of, or under, a contract with the U.S. Atomic Energy Commission.

This invention relates to a method and apparatus for energizing superconducting magnet coils. More specifically, it is directed to an incremental method for energizing such coils by repetitive electrical energy injection. Such devices are set forth generally in U.S. Patent No. 3,150,291 issued to H. L. Laquer on Sept. 22, 1964.

As stated therein, flux pumps enable the use of heavy, high current wire or ribbon for the solenoid winding while minimizing the large liquid helium losses which would occur when such currents are introduced directly by conventional leads from room temperature into the cryostat. Flux pumps devised in the past have used magnetically or thermally operated switches or have had moving parts. Some have also been complicated by saturable reactors or by delicate phasing adjustments. The present invention provides automatic switching by introducing a secondary superconducting switching or trapping coil of inductance $L_2$ in parallel with the larger superconducting main coil of inductance $L_1$.

It is accordingly an object of the present invention to flux pump a superconducting coil from an external source by utilizing an automatic switching technique so that only very simple circuitry is required within the cryogenic environment.

Figure 1:
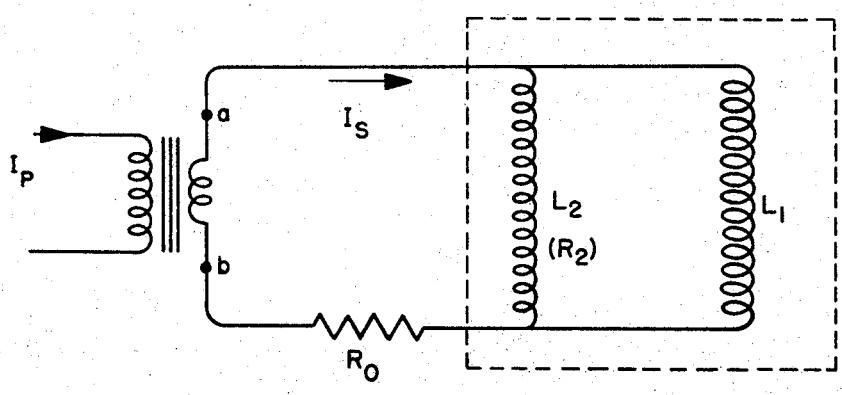
FIGURE 1 is a flux pump circuit diagram wherein the part enclosed in dashed lines is superconducting.
Figure 2:
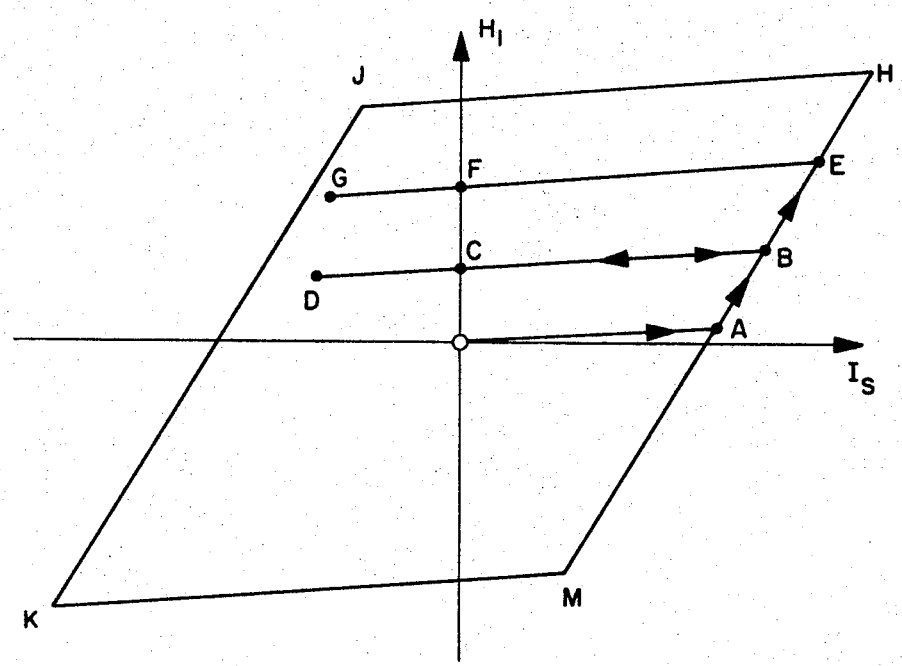
FIGURE 2 is a hysteresis pattern for parallel superconducting inductances, $H_1$ being the field inside the larger inductance $L_1$ and $I_S$ being the current applied to these inductances from any external source.
Figure 3:
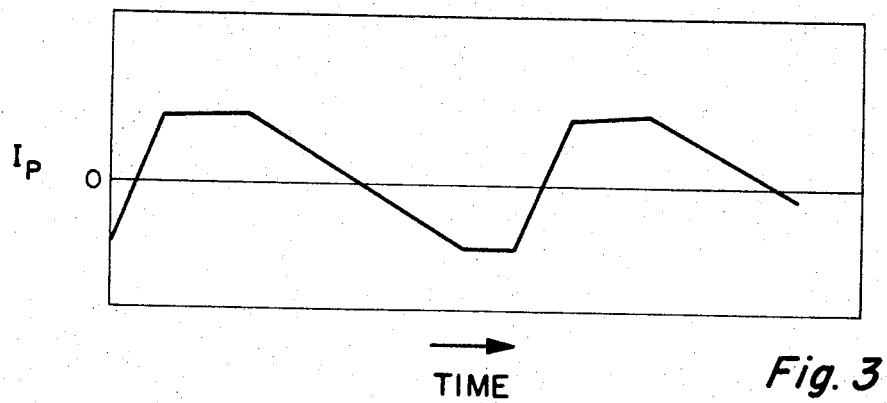

FIGURE 3 plots primary current versus time for the transformer device of FIGURE 1 operated as shown in FIGURE 2.

Figure 4:
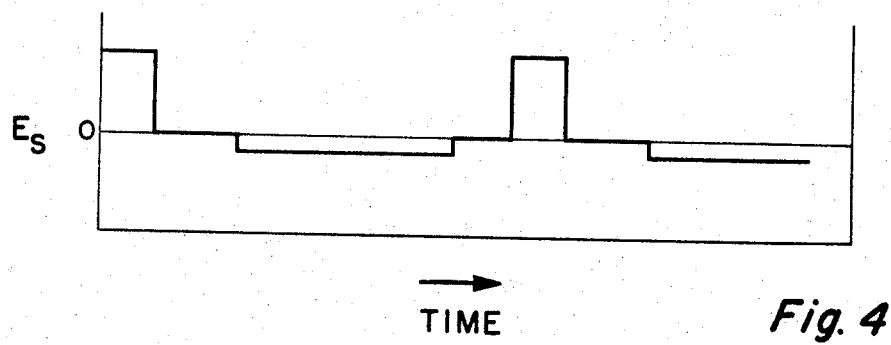

FIGURE 4 plots secondary voltage versus time for the transformer device of FIGURE 1 operated as shown in FIGURE 2.

Figure 5:
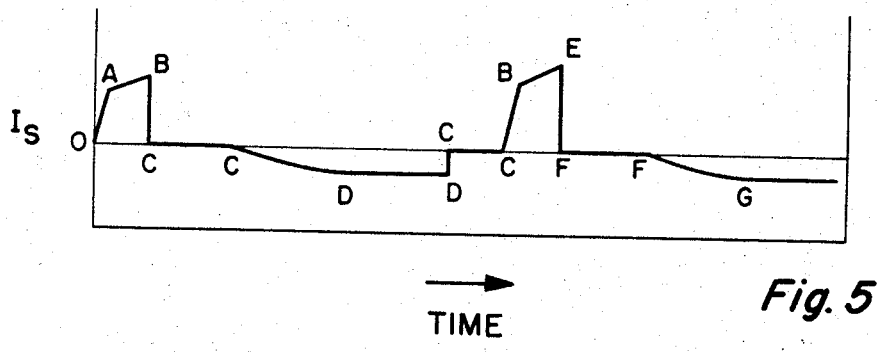

FIGURE 5 plots secondary current versus time for the transformer device of FIGURE 1 operated as shown in FIGURE 2.

The entire circuit shown in FIGURE 1 should be operated at cryogenic temperature but only the portion enclosed in dashed lines must be superconducting. If a step voltage $E_S$ is applied between points $a$ and $b$ (by the transformer secondary or by any other voltage source) the current $I_S$ will increase from zero at a rate determined by the two inductances $L_1$ and $L_2$. Neglecting mutual inductance effects, $I_S$ will divide inversely as the inductances between the larger coil $L_1$ and the smaller or switching coil $L_2$ until the current in $L_2$ reaches its critical value, $I_{C2}$, at which time $L_2$ becomes normally resistive with an effective resistance $R_2$. The critical value of current is a function of the material, the temperature, and the magnetic field. This point is represented by A in FIGURE 2 and thereafter, as long as $E_S$ is maintained, the current and flux in $L_1$ which remains superconducting will continue to build up at a rate governed by the time constants of the circuit and by the applied voltage. If at some subsequent time, as at B, the voltage $E_S$ is removed the current in $L_2$ will drop below its critical value so that coil $L_2$ returns into the superconducting state. Coils $L_1$ and $L_2$ then again form a closed superconducting loop or ring circuit. In such a geometry there can be no change in net magnetic flux, hence the algebraic sum of flux in coils $L_1$ and $L_2$ must remain constant. The rate of change of current through $L_1$ and $L_2$ will again be in the inverse ratio of their inductances. When $I_S$ does reach zero, as at point C, the current through $L_2$ will have reversed and will be just the persistent current through the ring circuit. If the inductance $L_1$ is much larger than $L_2$ most of the magnetic field present in $L_1$ at B will remain trapped at C. A subsequent reapplication of $E_S$ will have the effect of increasing $I_S$ and $H_1$ from point C to B to E or beyond.

By manipulating the external current it is possible to move, at will, around the outside of the hysteresis loop HJKM (see FIGURE 2) or to traverse it on any line parallel to O–A. Depending on whether the critical current in coil $L_1$ is greater or less than $L_2$ (as long as $L_1$ is greater than $L_2$) the corner point J of the major hysteresis loop will occur at positive or negative $I_S$ values (with the reverse relation for the corner point M). It is thus possible to trap any permissible field in coil $L_1$ by manipulating the transient current $I_S$. For optimal design, although it is not a condition of operation, $I_S$ need not exceed a value twice the maximum trapped current. Hence, coil $L_1$ can be excited to its persistent current mode using current pulses from a DC power supply or from a low voltage condenser bank. These methods of providing excitation are less desirable, however, owing to the fact that these schemes will generally introduce greater heat leaks into the cryogenic environment and consequently cause greater losses of liquid helium than a low temperature transformer and rectifier would.

Most semiconductor rectifiers used at ordinary temperatures require voltage drops of at least a few tenths of a volt and in general will not operate in liquid helium. However, it is evident from FIGURE 2 that due to the presence of $R_o$, the circuit itself has rectifying properties when it is fed with an unbalanced alternating voltage. The equivalent threshold voltage drops for rectification in this circuit amount to no more than 50 millivolts. The threshold current values for field changes (e.g., points A, B, E) given by the right and left boundaries of the hysteresis loop depend on the magnitude of the field present in $L_1$ and are, at any given field value, quite different for increases and decreases. The primary current change rates may be adjusted so that the secondary voltages, $E_S$, will produce critical current values only for one polarity of the transformer output voltage. Such an adjustment is easily made by applying an unsymmetrical current wave shape, $I_p$ (see FIGURE 3), to the primary of the transformer shown in FIGURE 1. The secondary voltage $E_S$ (FIGURE 4) in the negative direction can always be made insufficient to drive a critical switching current, $I_{C2}$, into $L_2$ through the normal resistance $R_o$. The lettered points on the secondary current, $I_S$, diagram (FIGURE 5), correspond to the same letters on the hysteresis pattern (FIGURE 2). FIGURE 2 serves to re-emphasize that a very important aspect of operating this flux pump is that the back swing from $I_S=0$ must be controlled so that points such as D and G do not touch the boundary of the major hysteresis loop. Thus, the asymmetry in the primary current produces switching of $L_2$ with secondary currents in the forward direction but not in the backward direction. Since there is less room available for the back swing, as the coil $L_1$ reaches its maximum field, the negative slope of $I_p$ may have to be adjusted at that time.

For best efficiency the normal state resistance $R_2$ of coil $L_2$ should be as large as possible. This means that an alloy material is preferred and that the coil be wound in such a manner as to reach its critical current uniformly over its entirety. A higher value of $R_2$ allows the application of higher voltages, $E_S$, and hence a quicker buildup of the magnetic field in coil $L_1$.

In the preferred embodiment, $L_2$ is a soft (Type I) superconductor and $L_1$ is a hard (Type II) superconductor. The soft superconductor may be, for example, lead base alloy, and the hard superconductor may be, for example, niobium base alloy.

The smoothest and most stable switching in $L_2$ has so far been obtained with single-layer lead or Pb-Sn solder wire coils (wire diam. 1/32 inch, coil I.D. 0.1 inch, 19 turns in 0.8 inch) wound to switch at 30 and 45 amperes respectively. Using the transformer employed with an earlier flux pump (see U.S. Patent No. 3,150,291 issued to H. L. Laquer on Sept. 22, 1964), a 956 turn, 10 layer, copper plated Nb-Zr wire coil $L_1$ (0.75 inch I.D., 1.06 inches O.D., 1.24 inches long) was pumped to about 10.5 koe. (corresponding to a current of 34 amperes). The toroidal iron core transformer had a 500 turn superconducting primary winding and a 5 turn copper secondary which provided $R_o$. Maximum field could be obtained by 70 to 100 pumping cycles in 15 to 20 minutes. The field could also be held constant at any intermediate value and increased and decreased at will. It was persistent near 10 koe. to the precision of the field measuring device ($\pm 1$ oersted) for an hour and in another experiment was observed to be constant at 7 koe. for about twenty hours.

Since the entire ring circuit including $L_1$ and $L_2$ must be superconducting it was necessary to join wires of dissimilar alloys (e.g., Nb-Zr and Pb-Sn). Construction of the contact involves first removing the copper coating which is used to stabilize commercially available 10-mil Nb-25% Zr wire. This can be done by simply rubbing the wire with emery cloth until the copper plating splits and peels off. Further light sanding will remove most of the oxide layer on the Nb-Zr wire. A strip about 3/8 inch wide and 2 inches long is then cut from 3 mil Nb sheet, and this is brushed with an electrical rotary wire brush to remove any surface contamination. The wire and foil are wiped thoroughly with a solvent and fastened together by a spot-weld every 1/8 inch or so down the center of the foil. A few drops of ethyl alcohol can be used to cover the wire while each spot-weld is made, to prevent oxidation.

A solder of Pb-5% In is next used to tin the Nb foil on both sides of the wire, and the wire itself. A small conventional soldering iron is used along with a hot plate on which the foil is placed during the tinning. The use of too much solder should be avoided and the job done as quickly as possible before an oxide layer forms.

The contact is finally realized by laying the 1/32 inch Pb-Sn solder along the Nb-Zr wire on the tinned part of the foil and squeezing it between two flat surfaces so that the soft superconductor yields slightly and coheres to the tinning. Two rectangular copper blocks were used for the clamps, after wetting the surfaces with an In-Ga mixture. The clamps were in turn connected to the secondary winding of the transformer.

Although the invention has been described in detail, it should be clearly understood that it is by way of example only and is not to be taken as limiting the invention. For example, the device of the present invention may be modified by superimposing a DC bias magnetic field on the $L_2$ coil. The impressed field will lower the critical current in the positive direction at which point superconductivity ceases, thereby obtaining quicker switching. In addition, this improvement would have the benefit of increasing the critical current in the negative direction since then the field is opposed to that generated by the $L_2$ coil. In this particular arrangement the primary transformer current would no longer have to be asymmetrical.

What is claimed is:

1. In a superconducting magnetic flux pump circuit, the improvement comprising a large hard superconducting inductance and a small soft superconductor inductance connected in series with each other and in parallel with an alternating voltage source consisting of an electrical transformer, means connected to the primary winding of said transformer to induce an asymmetrical secondary waveform having a negative amplitude less than the positive amplitude whereby rectification occurs automatically.

2. The circuit of claim 1 wherein the hard superconductor is a Nb base and the soft superconductor is of a Pb base and are electrically connected by welding portions of each of said superconductors to a niobium foil wetted with a Pb-5 w/o indium alloy.

References Cited

UNITED STATES PATENTS

| | | |
|---|---|---|
| 2,949,602 | 8/1960 | Crowe. |
| 2,987,631 | 6/1961 | Park. |
| 3,088,077 | 4/1963 | Schmitt et al. |

GEORGE HARRIS, *Primary Examiner.*

UNITED STATES PATENT OFFICE
CERTIFICATE OF CORRECTION

Patent No. 3,414,777                    Dated December 3, 1968

Inventor(s) Henry D. Laquer, Keith J. Carroll, Edward F. Hammel

It is certified that error appears in the above-identified patent and that said Letters Patent are hereby corrected as shown below:

In claim 1, column 4, line 34, "series" should read --parallel--.

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents